(12) United States Patent
Gamble, IV et al.

(10) Patent No.: US 12,210,932 B2
(45) Date of Patent: Jan. 28, 2025

(54) OBSERVATIONAL BAYESIAN OPTIMIZATION OF QUANTUM-COMPUTING OPERATIONS

(71) Applicant: Microsoft Technology Licensing, LLC, Redmond, WA (US)

(72) Inventors: John King Gamble, IV, Redmond, WA (US); Christopher Evan Granade, Redmond, WA (US); Guenevere Elaine Diah Kartika Prawiro-Atmodjo, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 674 days.

(21) Appl. No.: 17/448,674

(22) Filed: Sep. 23, 2021

(65) Prior Publication Data

US 2023/0090148 A1    Mar. 23, 2023

(51) Int. Cl.
*G06N 10/00* (2022.01)
*G06N 20/00* (2019.01)

(52) U.S. Cl.
CPC ............ *G06N 10/00* (2019.01); *G06N 20/00* (2019.01)

(58) Field of Classification Search
CPC ........ G06N 10/00; G06N 20/00; G06N 20/10; G06N 10/40; G06N 7/01; G06N 10/60
See application file for complete search history.

(56) References Cited

U.S. PATENT DOCUMENTS 11,681,845 B2 * 6/2023 Flöther ................. G06N 10/20
                                                        716/135
2020/0394524 A1 * 12/2020 Vainsencher .......... G06N 3/084
2021/0304054 A1 * 9/2021 Neill ...................... G06N 10/70
2021/0374611 A1 * 12/2021 Ronagh ................. G06N 3/084
2022/0199888 A1 * 6/2022 Daraeizadeh .......... G06N 10/00

FOREIGN PATENT DOCUMENTS

WO       2020076493 A1    4/2020

OTHER PUBLICATIONS

Oliveira, et al., "Bayesian Optimisation for Safe Navigation under Localisation Uncertainty", In Repository of arXiv:1709.02169v2, Feb. 17, 2018, pp. 1-16.
"International Search Report and Written Opinion Issued in PCT Application No. PCT/US22/035205", Mailed Date: Oct. 5, 2023, 13 Pages.
Sauvage, et al., "Optimal Quantum Control With Poor Statistics", In Repository of arXiv:1909.01229v3, Jul. 2, 2020, pp. 1-19.

* cited by examiner

*Primary Examiner* — Nha T Nguyen
(74) *Attorney, Agent, or Firm* — Alleman Hall & Tuttle LLP

(57) ABSTRACT

A method for calibrating a quantum-computing operation comprises: (a) providing a trial control-parameter value to the quantum computer; (b) receiving from the quantum computer a result of a characterization experiment enacted according to the trial control-parameter value; (c) computing a decoder estimate of an objective function evaluated at the trial control-parameter value based on decoding the result of the characterization experiment; (d) consuming the trial control-parameter value and the decoder estimate in a machine trained to return a model estimate of the objective function evaluated at the trial control-parameter value; and (e) selecting a new trial control-parameter value based on the model estimate.

19 Claims, 10 Drawing Sheets

OBSERVATIONAL BAYESIAN
OPTIMIZATION OF
QUANTUM-COMPUTING OPERATIONS

BACKGROUND

A quantum computer is a physical machine configured to execute logical operations based on or influenced by quantum-mechanical phenomena. Such logical operations may include, for example, mathematical computation. Current interest in quantum-computer technology is motivated by analysis suggesting that the computational efficiency of an appropriately configured quantum computer may surpass that of any practicable non-quantum computer when applied to certain types of problems. Such problems include computer modeling of natural and synthetic quantum systems, integer factorization, data searching, and function optimization as applied to systems of linear equations and machine learning. Moreover, it has been predicted that continued miniaturization of conventional computer-logic structures will lead ultimately to elements that exhibit quantum effects, and must be addressed, therefore, according to quantum-computing principles.

SUMMARY

One aspect of this disclosure is directed to a method for calibrating a quantum-computing operation on a quantum computer. The method comprises: (a) providing a trial control-parameter value to the quantum computer; (b) receiving from the quantum computer a result of a characterization experiment enacted according to the trial control-parameter value; (c) computing a decoder estimate of an objective function evaluated at the trial control-parameter value based on decoding the result of the characterization experiment; (d) consuming the trial control-parameter value and the decoder estimate in a machine trained to return a model estimate of the objective function evaluated at the trial control-parameter value; and (e) selecting a new trial control-parameter value based on the model estimate.

This Summary is provided to introduce in simplified form a selection of concepts that are further described in the Detailed Description. This Summary is not intended to identify key features or essential features of the claimed subject matter, nor is it intended to be used to limit the scope of the claimed subject matter. The claimed subject matter is not limited to implementations that solve any or all disadvantages noted in any part of this disclosure.

DETAILED DESCRIPTION

This disclosure presents observational Bayesian optimization of quantum-computing operations—a method employing a novel observational step in Bayesian optimization. In Bayesian optimization, an objective function is evaluated iteratively by conducting characterization experiments. At each iteration a surrogate model is updated based on the experimental results, and model results are used to inform the acquisition process that determines the control points at which the next characterization experiment is to be conducted. In the methods herein, an observational step is inserted between the characterization experiment and the model. More specifically, an observational decoder is used to compute the objective function based on the experimental results; the model is trained based on decoded objective-function estimates instead of the results themselves. In some examples, estimates of uncertainty in the objective-function estimate are exchanged between the model and the observational decoder to accelerate convergence and improve the accuracy of the model.

1. Quantum-Computer Architecture

Figure 1:
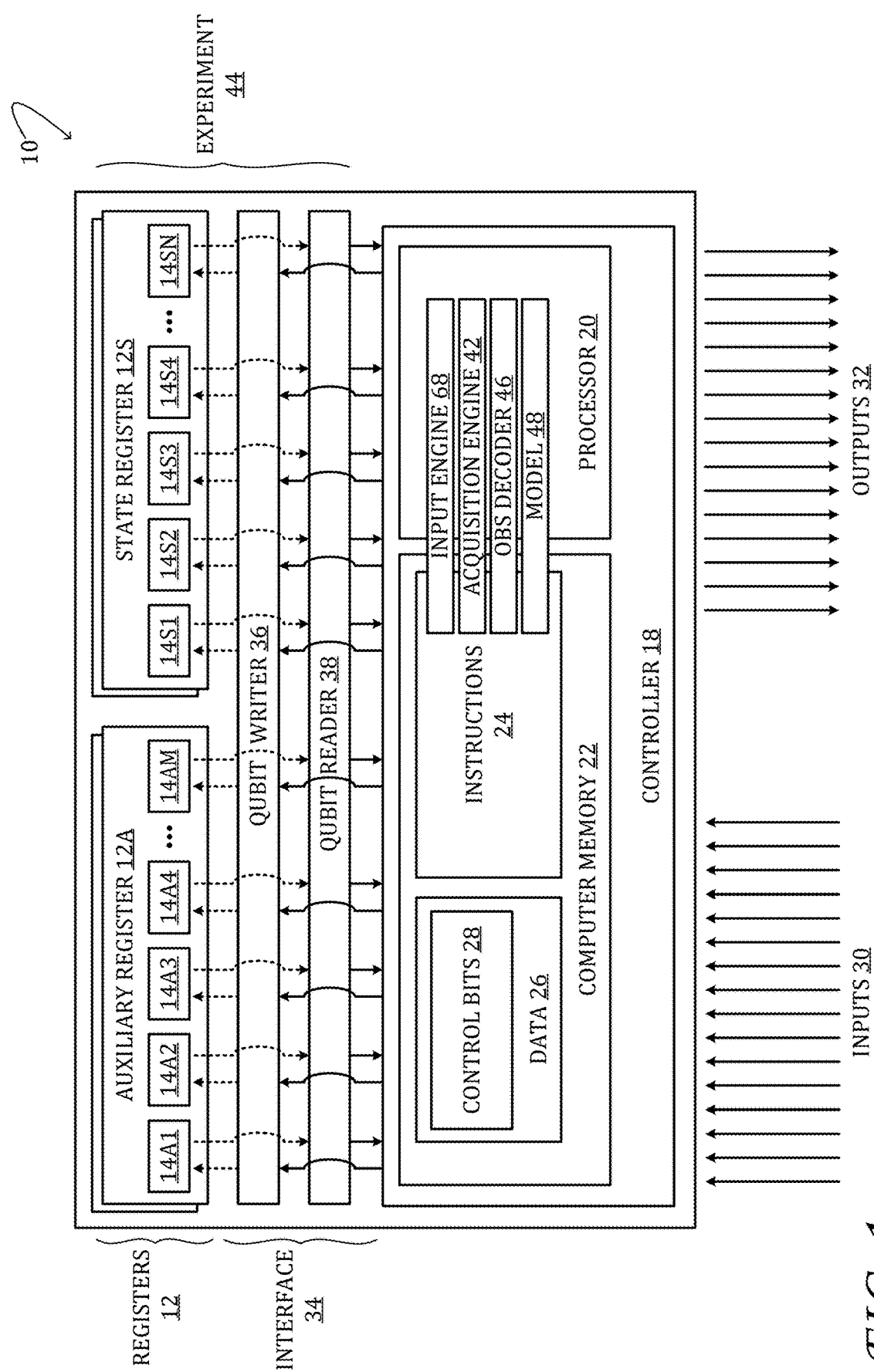
FIG. 1 shows aspects of an example quantum computer.

In order to provide a context for observational Bayesian optimization of quantum-computing operations, some aspects of an example quantum-computer architecture will first be described. Turning now to the drawings, FIG. 1 shows aspects of an example quantum computer 10 configured to execute quantum-logic operations (vide infra). Whereas conventional computer memory holds digital data in an array of bits and enacts bit-wise logic operations, a quantum computer holds data in an array of qubits and operates quantum-mechanically on the qubits in order to implement the desired logic. Accordingly, quantum computer 10 of FIG. 1 includes a set of qubit registers 12—e.g., state register 12S and auxiliary register 12A. Each qubit register includes a series of qubits 14. The number of qubits in a qubit register is not particularly limited but may be determined based on the complexity of the quantum logic to be enacted by the quantum computer.

Qubits 14 of qubit register 12 may take various forms, depending on the desired architecture of quantum computer 10. Each qubit may comprise: a superconducting Josephson junction, a trapped ion, a trapped atom coupled to a high-finesse cavity, an atom or molecule confined within a fullerene, an ion or neutral dopant atom confined within a host lattice, a quantum dot exhibiting discrete spatial- or spin-electronic states, electron holes in semiconductor junctions entrained via an electrostatic trap, a coupled quantum-wire pair, an atomic nucleus addressable by magnetic resonance, a free electron in helium, a molecular magnet, or a metal-like carbon nanosphere, as non-limiting examples. A qubit may be implemented in the plural processing states corresponding to different modes of light propagation through linear optical elements (e.g., mirrors, beam splitters and phase shifters), as well as in states accumulated within a Bose-Einstein condensate. More generally, each qubit 14 may comprise any particle or system of particles that can exist in two or more discrete quantum states that can be measured and manipulated experimentally.

Figure 2:
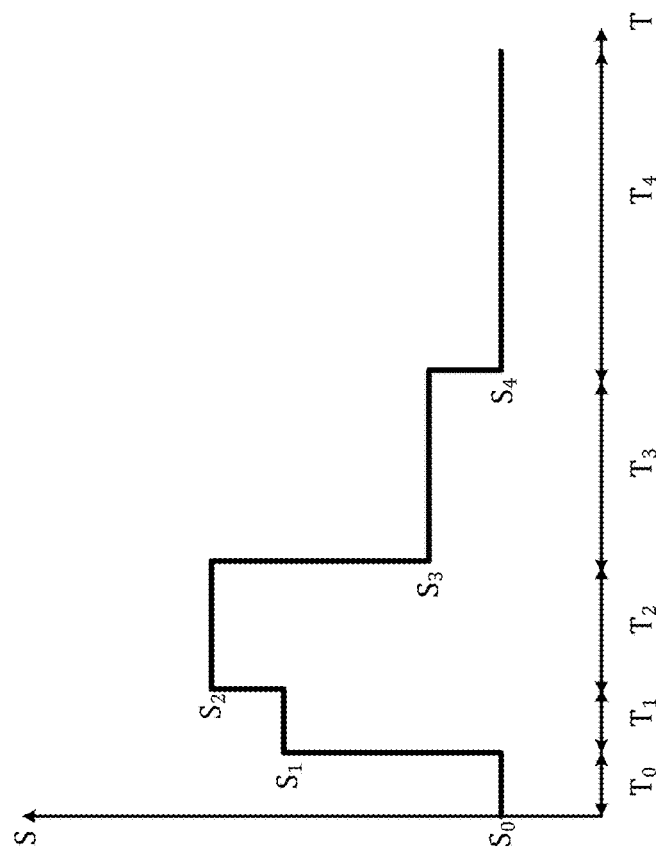
FIG. 2 illustrates a Bloch sphere, which graphically represents the quantum state of one qubit of a quantum computer.

FIG. 2 is an illustration of a Bloch sphere 16, which provides a graphical description of some quantum mechanical aspects of an individual qubit 14. In this description, the north and south poles of the Bloch sphere correspond to the standard basis vectors $|0\rangle$ and $|1\rangle$, respectively—up and down spin states, for example, of an electron or other fermion. The set of points on the surface of the Bloch sphere comprise all possible pure states $|\psi\rangle$ of the qubit, while the interior points correspond to all possible mixed states. A mixed state of a given qubit may result from decoherence, which may occur because of undesirable coupling to external degrees of freedom.

Returning now to FIG. 1, quantum computer 10 includes a controller 18. The controller may include at least one processor 20 and associated computer memory 22. Processor 20 may be coupled operatively to peripheral componentry, such as network componentry, to enable the quantum computer to be operated remotely. Processor 20 may take the form of a central processing unit (CPU), a graphics processing unit (GPU), or the like. As such, controller 18 may comprise classical electronic componentry. The terms 'classical' and 'non-quantum' are applied herein to any component that can be modeled accurately without considering the quantum state of any individual particle therein. Classical electronic components include integrated, microlithographed transistors, resistors, and capacitors, for example. Computer memory 22 may be configured to hold program instructions 24 that cause processor 20 to execute any function or process of controller 18. The computer memory may also be configured to hold additional data 26. In some examples, data 26 may include a register of classical control bits 28 that influence the operation of the quantum computer during run time—e.g., to provide classical control input to one or more quantum-gate operations. In examples in which qubit register 12 is a low-temperature or cryogenic device, controller 18 may include control componentry operable at low or cryogenic temperatures—e.g., a field-programmable gate array (FPGA) operated at 77K. In such examples, the low-temperature control componentry may be coupled operatively to interface componentry operable at normal temperatures.

Controller 18 of quantum computer 10 is configured to receive a plurality of inputs 30 and to provide a plurality of outputs 32. The inputs and outputs may each comprise digital and/or analog lines. At least some of the inputs and outputs may be data lines through which data is provided to and/or extracted from the quantum computer. Other inputs may comprise control lines via which the operation of the quantum computer may be adjusted or otherwise controlled.

Controller 18 is operatively coupled to qubit registers 12 via quantum interface 34. The quantum interface is configured to exchange data (solid lines) bidirectionally with the controller. The quantum interface is further configured to exchange signal associated with the data (dashed lines) bidirectionally with the qubit registers. Depending on the physical implementation of qubits 14, such signal may include electrical, magnetic, and/or optical signal. Via signal conveyed through the quantum interface, the controller may interrogate and otherwise influence the quantum state held in any, some, or all of the qubit registers, as defined by the collective quantum state of the qubits therein. To that end, the quantum interface includes qubit writer 36 and qubit reader 38. The qubit writer is configured to output a signal to one or more qubits of a qubit register based on write-data received from the controller. The qubit reader is configured to sense a signal from one or more qubits of a qubit register and to output read-data to the controller based on the signal. The read-data received from the qubit reader may, in some examples, be an estimate of an observable to the measurement of the quantum state held in a qubit register. Taken together, controller 18 and interface 34 may be referred to as a 'control system'.

In some examples, suitably configured signal from qubit writer 36 may interact physically with one or more qubits 14 of a qubit register 12, to trigger measurement of the quantum state held in the one or more qubits. qubit reader 38 may then sense a resulting signal released by the one or more qubits pursuant to the measurement, and may furnish read-data corresponding to the resulting signal to controller 18. Stated another way, the qubit reader may be configured to output, based on the signal received, an estimate of one or more observables reflecting the quantum state of one or more qubits of a qubit register, and to furnish the estimate to controller 18. In one non-limiting example, the qubit writer may provide, based on data from the controller, an appropriate voltage pulse or pulse train to an electrode of one or more qubits, to initiate a measurement. In short order, the qubit reader may sense photon emission from the one or more qubits and may assert a corresponding digital voltage level on a quantum-interface line into the controller. Generally speaking, any measurement of a quantum-mechanical state is defined by the operator O corresponding to the observable to be measured; the result R of the measurement is guaranteed to be one of the allowed eigenvalues of O. In quantum computer 10, R is statistically related to the qubit-register state prior to the measurement, but is not uniquely determined by the qubit-register state.

Pursuant to appropriate input from controller 18, quantum interface 34 may be configured to implement one or more quantum-logic gates to operate on the quantum state held in a qubit register 12. The term 'state vector' refers herein to the quantum state held in the series of qubits 14S of state register 12S of quantum computer 10. Whereas the function of each type of logic gate of a classical computer system is described according to a corresponding truth table, the function of each type of quantum gate is described by a corresponding operator matrix. The operator matrix operates on (i.e., multiplies) the complex vector representing a qubit register state and effects a specified rotation of that vector in Hilbert space.

For example, the Hadamard gate H is defined by $$H = \frac{1}{\sqrt{2}} \begin{bmatrix} 1 & 1 \\ 1 & -1 \end{bmatrix}. \quad (1)$$

The H gate acts on a single qubit; it maps the basis state |0⟩ to (|0⟩+|1⟩))/√2, and maps |1⟩ to (|0⟩−|1⟩)/√2. Accordingly, the H gate creates a superposition of states that, when measured, have equal probability of revealing |0⟩ or |1⟩.

The phase gate S is defined by $$S = \begin{bmatrix} 1 & 0 \\ 0 & e^{i\pi/2} \end{bmatrix}. \quad (2)$$

The S gate leaves the basis state |0⟩ unchanged but maps |1⟩ to $e^{i\pi/2}|1\rangle$. Accordingly, the probability of measuring either |0⟩ or |1⟩ is unchanged by this gate, but the phase of the quantum state of the qubit is shifted. This is equivalent to rotating ψ by 90 degrees along a circle of latitude on the Bloch sphere of FIG. 2.

Some quantum gates operate on two or more qubits. The SWAP gate, for example, acts on two distinct qubits and swaps their values. This gate is defined by $$SWAP = \begin{bmatrix} 1 & 0 & 0 & 0 \\ 0 & 0 & 1 & 0 \\ 0 & 1 & 0 & 0 \\ 0 & 0 & 0 & 1 \end{bmatrix}. \quad (3)$$

A 'Clifford gate' is a quantum gate that belongs to the Clifford group—viz., a set of quantum gates that effect permutations of the Pauli operators. For the n-qubit case the Pauli operators form a group $$P_n = \left\{ e^{\frac{i\theta\pi}{2}} \sigma_{j_1} \otimes \ldots \otimes \sigma_{j_n} \,\middle|\, \theta = 0, 1, 2, 3,\, j_k = 0, 1, 2, 3 \right\}, \quad (4)$$

where $\sigma_0, \ldots \sigma_3$ are the single-qubit Pauli matrices. The Clifford group is then defined as the group of unitaries that normalize the Pauli group, $$C_n = \{V \in U_{2^n} | V P_n V^\dagger =_{P_n}\}. \quad (5)$$

The foregoing list of quantum gates and associated operator matrices is non-exhaustive, but is provided for ease of illustration. Other quantum gates include Pauli −X, −Y, and −Z gates, the $\sqrt{NOT}$ gate, additional phase-shift gates, the $\sqrt{SWAP}$ gate, controlled cX, cY, and cZ gates, and the Toffoli, Fredkin, Ising, and Deutsch gates, as non-limiting examples.

Figure 3:
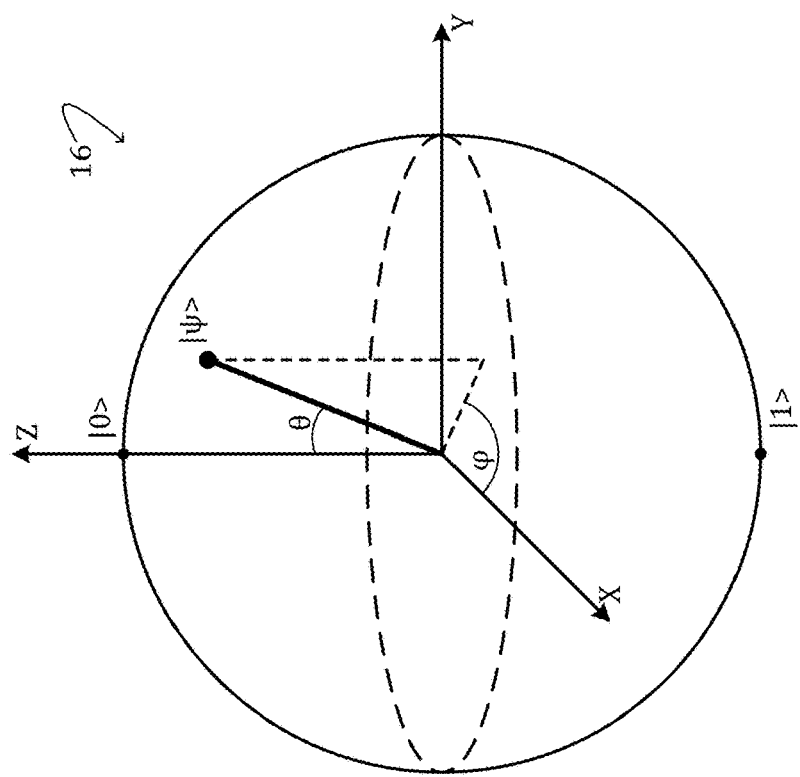
FIG. 3 shows aspects of an example signal waveform for effecting a quantum-gate operation in a quantum computer.

Continuing in FIG. 1, suitably configured signal from qubit writer 36 of quantum interface 34 may interact physically with one or more qubits 14 of a qubit register 12 so as to assert any desired quantum-gate operation. As noted above, the desired quantum-gate operations include specifically defined rotations of a complex vector representing a qubit register state. In some examples, in order to effect a desired rotation O, the qubit writer may apply a predetermined signal level $S_i$ for a predetermined duration $T_i$. In some examples, plural signal levels may be applied for plural sequenced or otherwise associated durations, as shown in FIG. 3, to assert a quantum-gate operation on one or more qubits of a qubit register. In general, each signal level $S_i$ and each duration $T_i$ is a control parameter adjustable by appropriate programming of controller 18.

The terms 'oracle' and 'quantum algorithm' are used herein to describe a predetermined sequence of elementary quantum-gate and/or measurement operations executable by quantum computer 10. An oracle may be used to transform the quantum state of a qubit register 12 to effect a classical or non-elementary quantum-gate operation or to apply a density operator, for example. In some examples, an oracle may be used to enact a predefined 'black-box' operation f(x), which may be incorporated into a complex sequence of operations. To ensure adjoint operation, an oracle mapping n input qubits |x⟩ to m output or auxiliary qubits |y=f(x)⟩ may be defined as a quantum gate O(|x⟩⊗|y⟩) operating on the (n+m) qubits. In this case, O may be configured to pass the n input qubits unchanged but combine the result of the operation f(x) with the auxiliary qubits via an XOR operation, such that O(|x⟩⊗|y⟩)=|x⟩∅|y⊕f(x)⟩.

Implicit in the description herein is that each qubit 14 of any qubit register 12 may be interrogated via quantum interface 34 so as to reveal with confidence the standard basis vector |0⟩ or |1⟩ that characterizes the quantum state of that qubit. In some implementations, however, measurement of the quantum state of a physical qubit may be subject to error. Accordingly, any qubit 14 may be implemented as a logical qubit, which includes a grouping of physical qubits measured according to an error-correcting oracle that reveals the quantum state of the logical qubit with above-threshold confidence.

2. Overview of Observational Bayesian Optimization of Experiments

Generally speaking, a quantum-computing operation (e.g., algorithm, oracle, gate, or measurement) is enacted in dependence on a set of one or more control parameters. Any figure of merit of the operation (accuracy, speed, resource utilization, etc.) can be quantified in terms of an objective function, and the objective function can be computed based on (typically many) results of a characterization experiment enacted on a quantum computer. Desired values for the control parameters may be unknown, guessed, or coarsely bracketed initially, but may be refined through optimization (minimization or maximization, as appropriate) of the objective function. In this disclosure, that process is called 'calibration' of a quantum-computing operation.

Figure 4:
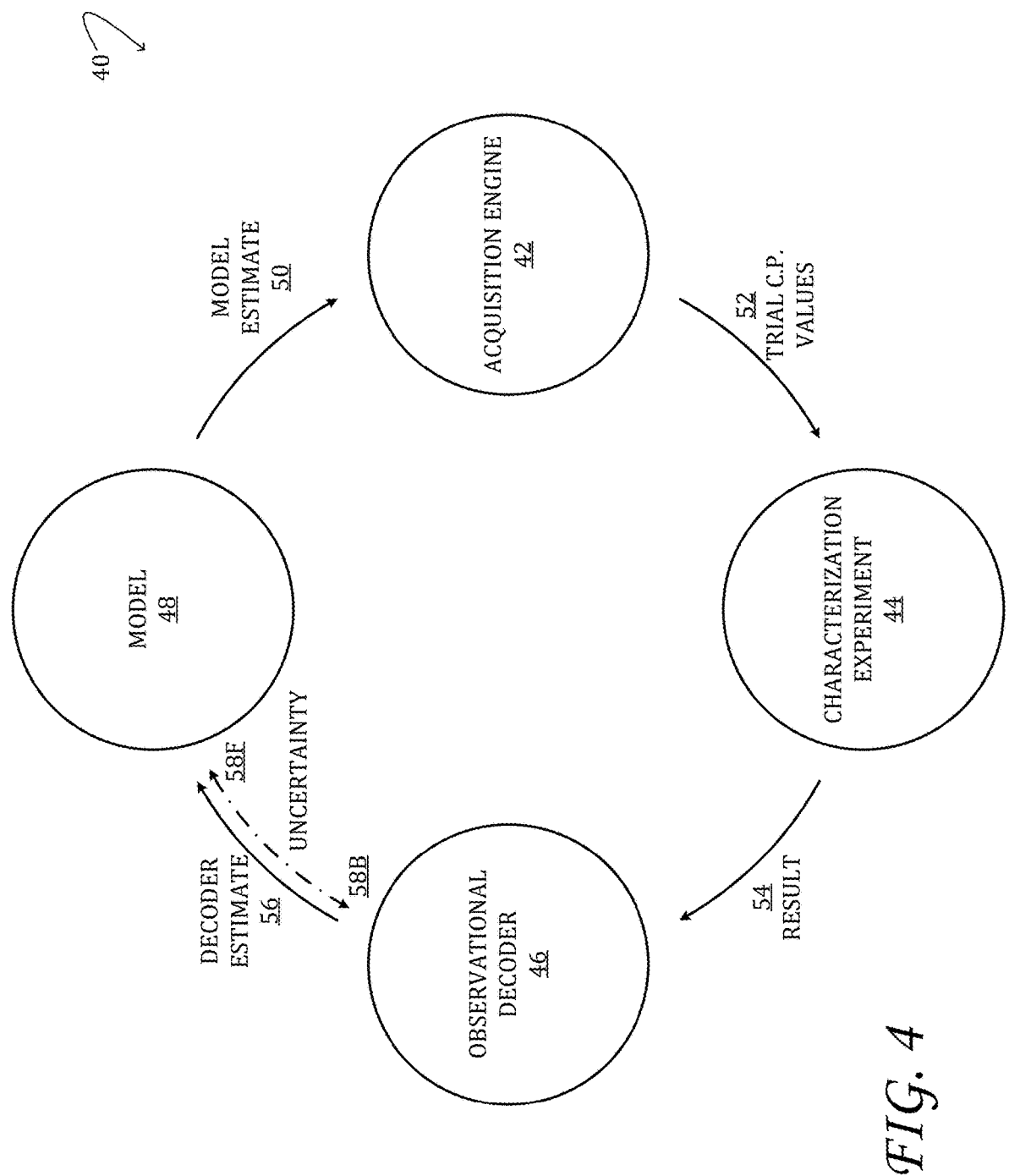
FIG. 4 shows aspects of an example method for calibrating a quantum-computing operation.

FIG. 4 shows aspects of an example method 40 for calibrating a quantum-computing operation. In particular, FIG. 4 is an iterative feedback loop illustrating various functional components and data used in the method. The functional components include acquisition engine 42, characterization experiment 44, observational decoder 46, and model 48.

In naive numerical optimization, an objective function may be estimated merely by conducting characterization experiment 44 on a quantum computer. Each evaluation of the objective function is passed directly to an acquisition engine, which returns trial control-parameter values that specify how the next characterization experiment is to be conducted—i.e., where the objective function will be evaluated next in the control-parameter space. In effect, the acquisition engine directs iterative evaluation of the objective function at different control points, driving toward a local or global extremum to advance the optimization.

Bayesian optimization increases optimization efficiency in scenarios in which the objective function is expensive to compute. In that approach, each evaluation of the objective function contributes to an evolving model 48, which serves as an inexpensive surrogate for actual evaluation of the objective function. The configuration of the model is not particularly limited. In some examples, the model may comprise machine-learning (ML) models. Particular examples include Gaussian process models, Student's-T process models, and random forest models. In general, model 48 is implemented on a computer system in the form of a trained machine. Accordingly, the terms 'model 48' and 'trained machine' or 'trainable machine' are used interchangeably herein.

As shown in FIG. 4, acquisition engine 42 draws from the model a model estimate 50 of the objective function and, through global optimization, arrives at a new set of trial control-parameter values 52. The acquisition engine may be configured (a) to converge rapidly to optimized control-parameter values, (b) to refine the model (e.g., to further train an ML model and/or expand a prior distribution), or (c) to achieve any predetermined compromise between (a) and (b). Particular examples of acquisition engines include Upper Confidence Bound, Probability of Improvement, Expected Improvement, and Thompson Sampling.

This disclosure recognizes that in quantum computing, the result of a characterization experiment done according to a set of control-parameter values may not easily reveal the objective function evaluated at those values. For example, each result may reveal only a standard basis state $|0\rangle$ or $|1\rangle$ of a qubit in a qubit register, whereas the objective function may be a real-valued function based statistically on many such results, or may be a derived function of a real-valued result.

To address that defect, method 40 includes an observational decoder 46 inserted between characterization experiment 44 and model 48. The observational decoder receives (i.e., observes) the result 54 of each characterization experiment enacted according to trial control-parameter values 52 and computes a decoder estimate 56 of the objective function evaluated at the same trial control-parameter values. The decoder estimate of the objective function is then passed to model 48. In some examples, the observational decoder also returns a forward uncertainty 58F of the decoder estimate at the trial control-parameter values, and the forward uncertainty is also passed to the model.

As noted above, model 48 is configured to return a model estimate 50 of the objective function evaluated at trial control-parameter values 52. Within the model, forward uncertainty 58F determines the weighting of the corresponding decoder estimate 56 of the objective function. Thus, the model continues to be refined during the optimization procedure. This feature can be leveraged to partially or comprehensively explore the control-parameter space, depending on how acquisition engine 42 is configured. In some examples, the model, after sufficient training, can provide its own, backward uncertainty 58B for any given set of trial control-parameter values—i.e., the uncertainty of the model estimate. The backward uncertainty can be fed back into observational decoder 46 to improve the accuracy of decoder estimate 56.

Observational Bayesian optimization of experiments (OBOE, as embodied in method 40) is especially useful when performing an operation involving a costly characterization experiment. Unlike other methods employing Bayesian optimization, method 40 is effective even when the experimental result is noisy or is an indirect measure of the objective. These features are especially relevant for quantum characterization experiments. As non-limiting examples, OBOE can be used to tune a quantum device into a desired control-parameter regime, an approach that readily extends to randomized benchmarking. OBOE can be used to explore the parameter space of a computer simulation of a realistic quantum device in an efficient way, even when the parameters tuned are indirectly connected to the output and when noise-like disorder connects input to output. OBOE can be used for tuning a qubit to a more ideal mode of operation by increasing process fidelity, diamond distance, or other qubit-quality metric, which may be noisy and indirect. OBOE can be used to accelerate hybrid quantum-classical optimization approaches, such as the variational quantum eigensolver. These examples and others are illustrated below.

Example I relates to calibration of a qubit gate. A qubit gate may comprise a rotation of a vector $|\psi\rangle$ that characterizes a qubit, as noted hereinabove and represented graphically in FIG. 2. Thus, the quantum operation in this example is application of the quantum gate, and the control-parameter values are the values defining the signal waveform that perturbs the qubit state—e.g., values $S_i$ and $T_i$ in FIG. 3. In this example, the characterization experiment comprises two acts performed in succession, which may be repeated many times: (a) applying the signal waveform to effect a rotation, and (b) measuring the quantum state of the qubit after the rotation. Each time the characterization experiment is enacted, the result reveals only a basis state of the qubit, either $|0\rangle$ or $|1\rangle$. Only by repeating the characterization experiment many times is the rotational angle revealed statistically, in the form of an expectation value. The expectation value may be used to compute coefficients of the state vector, which then provide the apparent rotation angle. The objective function, in this example, is defined as the absolute difference between the apparent and desired rotation angles. The observational decoder computes that value statistically, in dependence on the accumulated basis-state results.

Figure 5A:
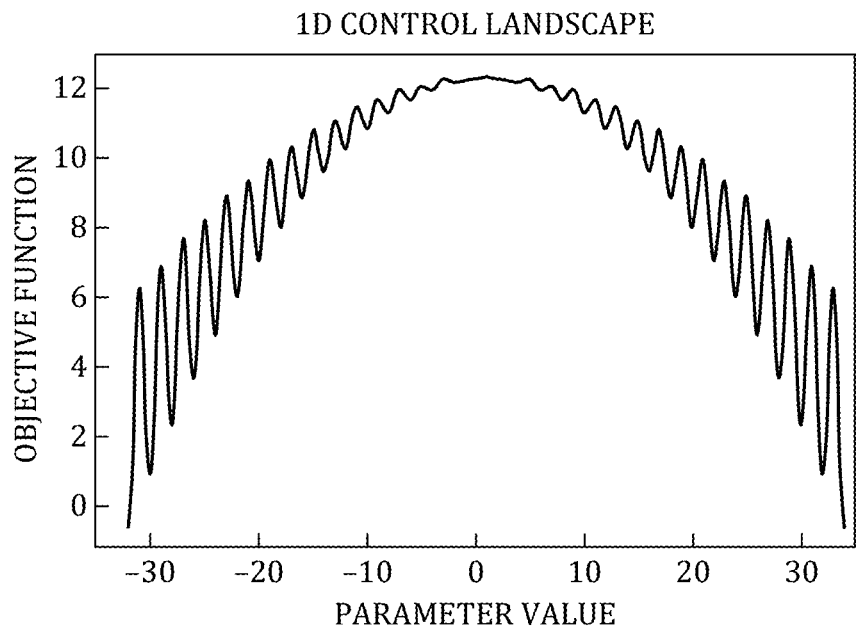
FIG. 5A is a plot of the precession frequency of an example qubit as a function of one control-parameter value.
Figure 5B:
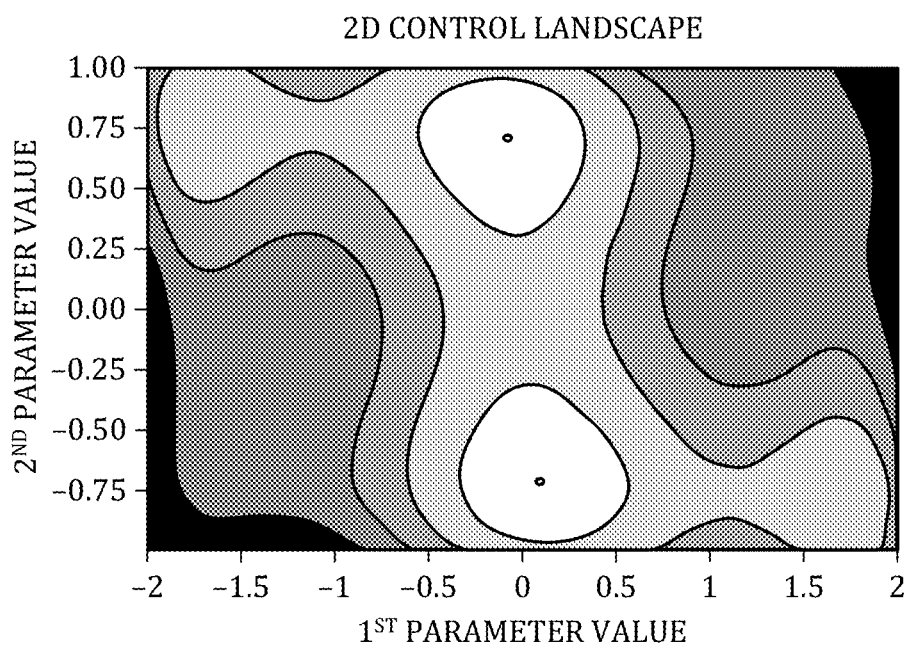
FIG. 5B is a plot of the precession frequency of an example qubit as a function of two control-parameter values.

Example II relates to Ramsey tuning of a qubit to maximize the precession frequency. The quantum operation in this example is to induce a precession in the state vector $|\psi\rangle$ that characterizes a qubit. The objective function is the frequency of the precession, which should be as high as possible to avoid computation errors due to decoherence. As shown in FIGS. 5A and 5B, the quantum operation may be enacted according to one or more control-parameter values that effect the precession frequency in a complicated manner. FIG. 5A shows a jagged, Levy-function dependence of the qubit precession frequency on one parameter value—e.g., a voltage that influences the qubit Hamiltonian. FIG. 5B shows a smooth, six-hump-camel-function dependence of the qubit precession frequency on two parameter values, where the function value is indicated by shading. In this example, as in the previous one, the characterization experiment comprises measurement of the quantum state of the evolving qubit. The result of the characterization experiment is again one of the standard basis states, $|0\rangle$ or $|1\rangle$, for each time that the characterization experiment is performed.

Figure 5C:
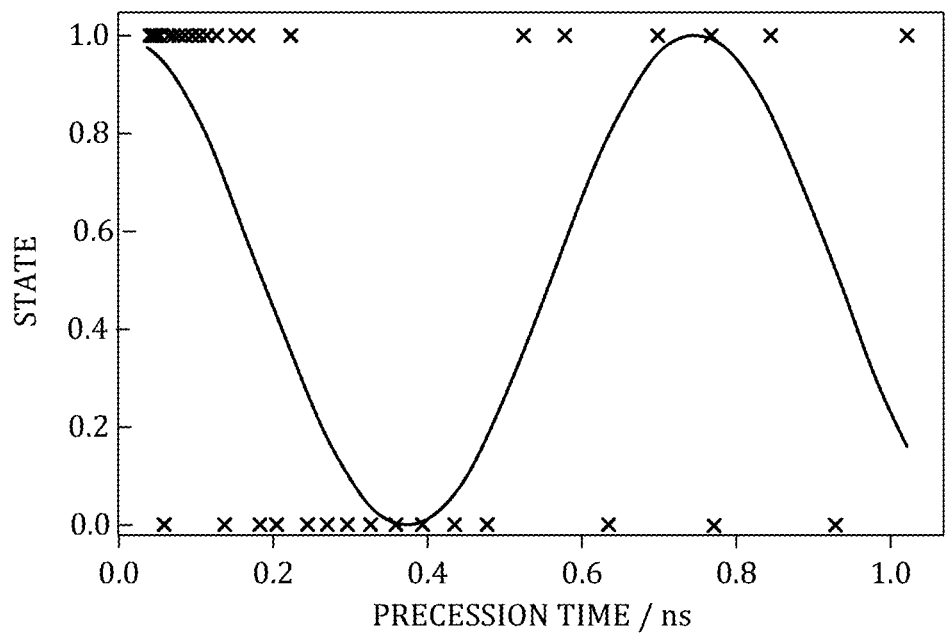
FIG. 5C is a plot showing experimental results and observational-decoder output for Ramsey tuning of an example qubit.

FIG. 5C illustrates the functionality of the observational decoder in this example. In this plot, each experimental result is shown as a cross at eigenvalue 0 or 1, at the time in which the measurement is made. Based on the distribution of results for identically prepared qubits measured at different times, the decoder estimates the coefficients of the state vector as functions of time and fits the complex-valued result to the expected function governing the time evolution of the state vector under the qubit Hamiltonian—e.g., $\psi=\exp(-ihf)$, where f, the precession frequency, is the objective function.

Figure 5D:
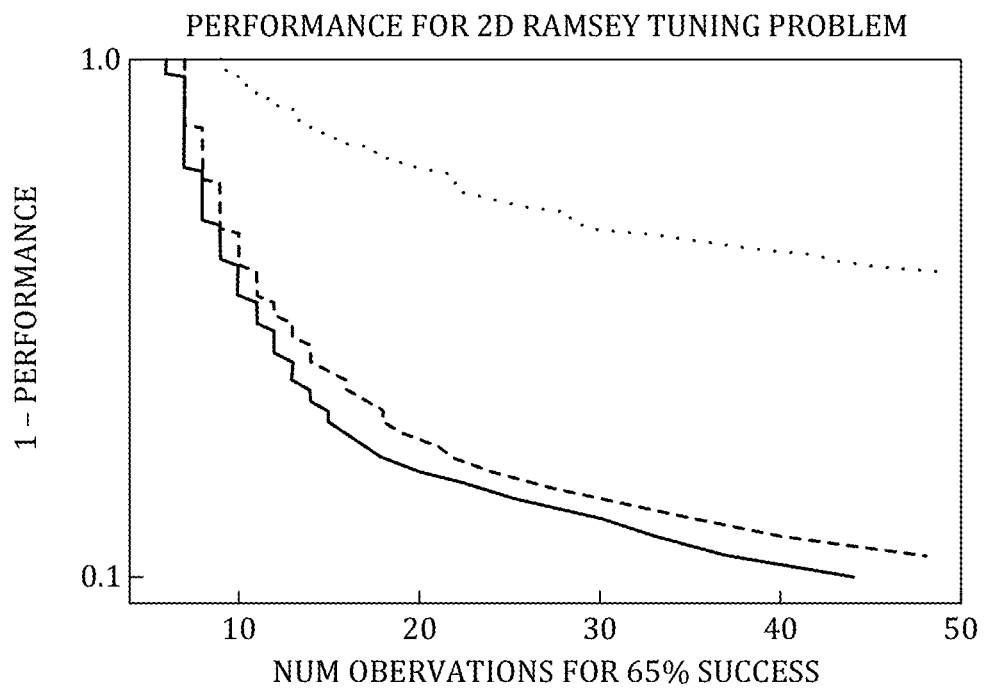
FIG. 5D is a plot of progress in the Ramsey tuning of an example qubit as a function of the number of observations required to achieve a 65% success rate, for three different optimization strategies.

FIG. 5D illustrates a comparison of three different procedures for optimizing the objective function in dependence on the two different control-parameter values represented in FIG. 5B. Progress toward the optimized maximum frequency is plotted as a function of the number of observations required to reach that frequency at a 65% success rate. The dotted line is a plot of the progress using differential-evolution (DE) optimization. The dashed line is a plot of the progress using state-of-the-art Bayesian optimization. The solid line is a plot of the progress using the observational Bayesian method of FIG. 4.

Figure 6A:
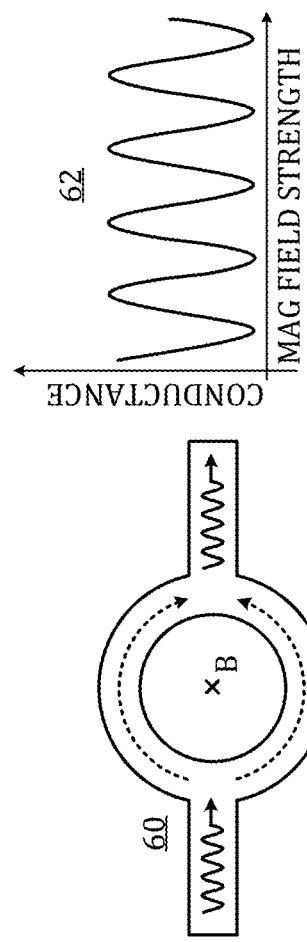
FIG. 6A shows aspects of an example Aharonov-Bohm (AB) ring.
Figure 6B:
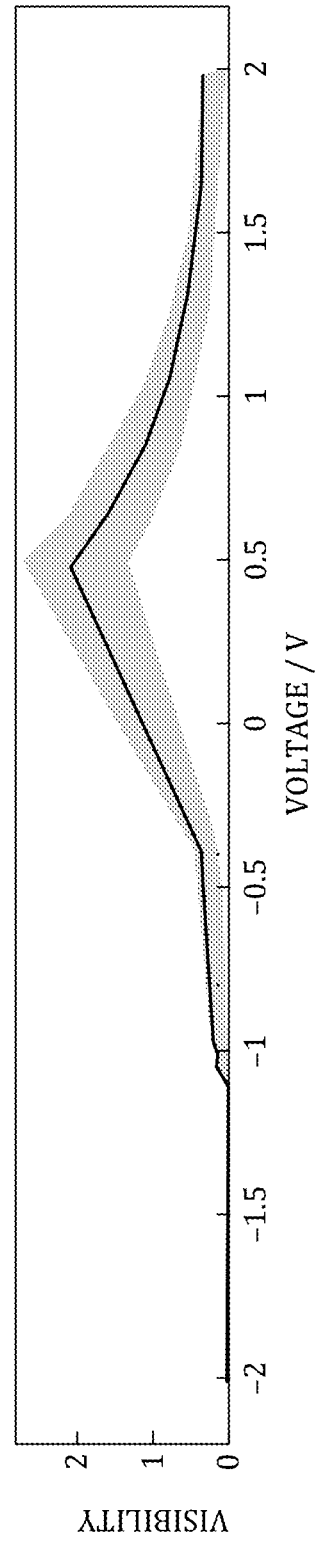
FIG. 6B is a plot of visibility of electron interference in an example AB ring as a function of control voltage.

Example III relates to the tuning of an Aharonov-Bohm (AB) ring for resolution of electron interference. FIG. 6A provides a schematic representation 60 of an AB ring, a graph 62 of the idealized operation of an AB ring, and a tracing of an electron micrograph 64 of an AB ring 66 fabricated on a semiconductor die. In this example, the objective function is the visibility (i.e., resolvability) of an interference pattern, which varies as a function of a control parameter. In this example, the AB signal is simulated as stochastic noise combined with the ideal signal 62. The control parameter is a control voltage applied to the gate of the AB ring, which controls the density of states (DOS) of electrons in the semiconductor die, in turn affecting the visibility. As shown in FIG. 6B, the model is set to have a peak visibility at control voltage 0.5 V. The shaded portion of the plot corresponds to the 60% interval of noise realizations of the stochastic device model.

Figure 6C:
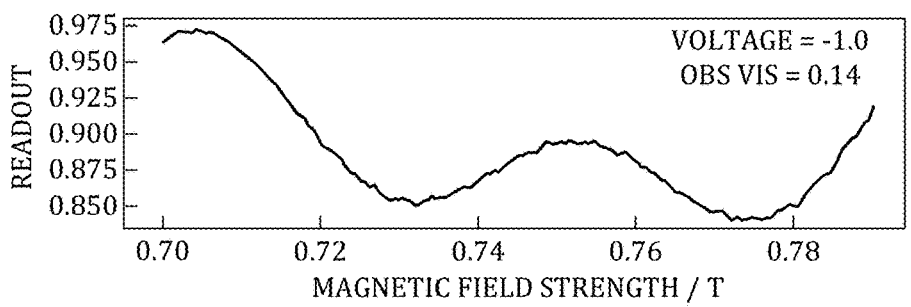
FIGS. 6C and 6E are plots of current measured through an example AB ring as functions of magnetic-field strength.
Figure 6D:
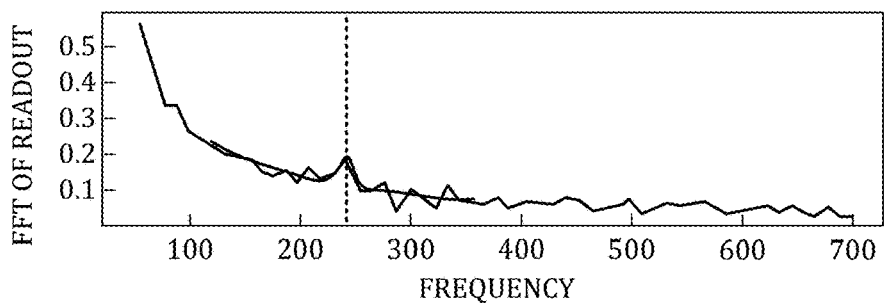
FIGS. 6D and 6F are plots of the Fourier transform of current measured through an example AB ring as functions of frequency.
Figure 6E:
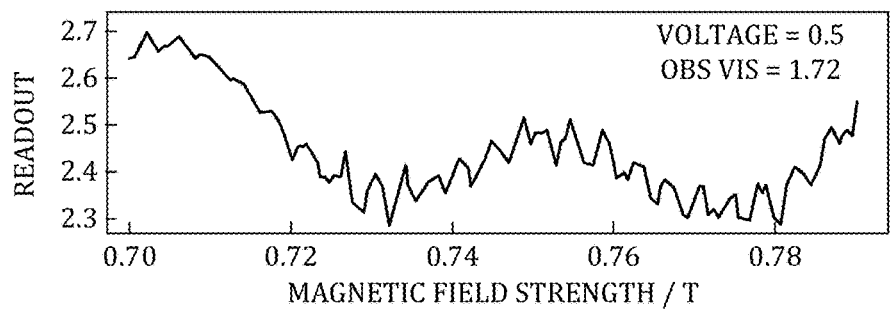

FIG. 6C shows the result of a typical characterization experiment for this example—viz., a plot of readout current (or conductance) as a function of the strength of the external magnetic field in the direction normal to the AB ring. During the characterization experiment, the field is slowly swept while the control voltage is maintained at the indicated value. For purpose of comparison, FIG. 6E provides another result of the same characterization experiment, but enacted at a different value of the control voltage.

Figure 6F:
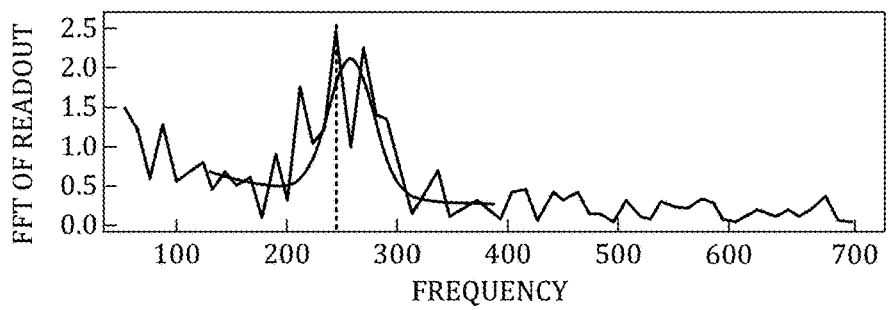

In order to compute the objective function in this example, the observational decoder: (a) computes a Fourier transform to convert the result into the frequency domain; (b) identifies and subtracts the baseline of the current-versus-frequency profile; (c) enacts a curve-fitting routine to identify one or more interference modes; and (d) computes the visibility based on suitable metrics—e.g., the amplitude of the most prominent mode, its separation from other modes, etc. FIG. 6D illustrates the decoding, for the result of FIG. 6C, through the curve-fitting step. FIG. 6F provides an analogous illustration for the result of FIG. 6E. It is interesting to note that the visibility is greater for the noisier result of FIG. 6E, thus underscoring an advantage of the methods herein.

Figure 6G:
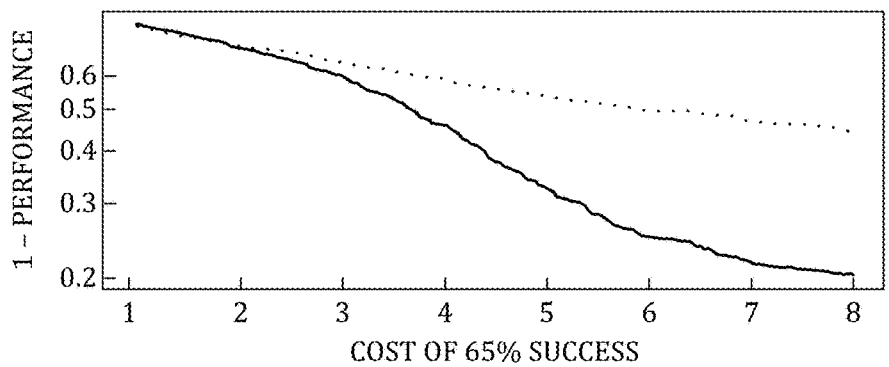
FIG. 6G is a plot of progress in tuning an example AB ring as a function of the number of observations required to achieve a 65% success rate, for two different optimization strategies.

FIG. 6G provides a comparison of two different procedures for optimizing the objective function in dependence on the control voltage. Progress toward optimized visibility is plotted as a function of the number of observations required to reach that visibility at a 65% success rate. The dotted line is a plot of the progress using differential-evolution (DE) optimization. The solid line is a plot of the progress using the observational Bayesian method of FIG. 4, where a two-fold improvement is realized. In this and other examples, OBOE offers the ability to start with previously acquired information and to easily control locality. The general approach described here for the AB ring can be applied to many other quantum devices as well—quantum dots, topological nanowires, etc.

Example IV relates to a variational eigensolver—a hybrid classical-quantum algorithm for finding the lowest-energy configuration of a physical system, such as the ground-state wave function of a molecule. In this example, the quantum operation to be calibrated is that of modeling the system based on qubits. The variational principle of quantum mechanics ensures that the expectation energy $\langle \psi|H|\psi \rangle$ of any well-behaved trial state $|\psi\rangle$ must be greater than or equal to the true ground-state energy of the system being simulated. Thus, a suitable objective function is the value of the expectation energy of a system of qubits under a Hamiltonian determined by certain control-parameter values.

Whereas the control parameters of the foregoing examples are hardware-control parameters, software-control parameters are also envisaged, as demonstrated by this example. In some examples, the control parameters may include coefficients or indices that determine how atoms are mapped to qubits. In some examples, the control parameters may include a vector θ of coefficients of a state-preparation oracle U(θ) that operates on a reference register state $|0\rangle \ldots |0\rangle$ to provide a trial state $\psi(\theta)$. The characterization experiment includes executing the oracle on the quantum computer and then measuring the expectation energy. The result of the characterization experiment is a set of basis states in the Hamiltonian. Repeating the characterization experiment many times provides a statistical estimate of the expectation energy for each qubit. Accordingly, the observational decoder may be configured to sample the basis-state results, compute the average value for each qubit, apply any appropriate weighting, and sum the weighted averages across the qubit register to compute the expectation energy for the entire system. In this example, uncertainties can be exchanged bidirectionally with the model. The acquisition engine may take the form of a Gaussian process configured to select the most informative control-parameter values to define the next trial state.

Example V relates to randomized benchmarking as a protocol for tuning collections of quantum gates. In this approach, the gates are arranged so that their overall product is the identity matrix. Accordingly, an objective function would report on the overall disturbance of the state vector with respect to its initial value, which should be as small as possible. The observational decoder computes that value based on the basis-state results.

In one variant of this example, the control parameters correspond to a vector of ansatz parameters θ, which are used to form a prior estimate $\hat{H}_{i,0} \pm \delta H_{i,0}$. The observational decoder draws N samples for each term and uses Bayes' rule to update the prior estimate and the uncertainty. In another variant of this example, the control parameters correspond to a vector of pulse parameters x, which are used to form a prior estimate $\hat{p}_0 \pm \delta p_{i,0}$. The observational decoder samples N adaptive, randomized-benchmarking characterization experiments and uses Bayes' rule to update the prior estimate and the uncertainty. In each case, the optimization method takes each observational process as input and propagates the uncertainty through a Gaussian model to predict the objective at future trial values of the control parameters. In this as in previous examples, uncertainties may be exchanged bidirectionally with the model.

Figure 7:
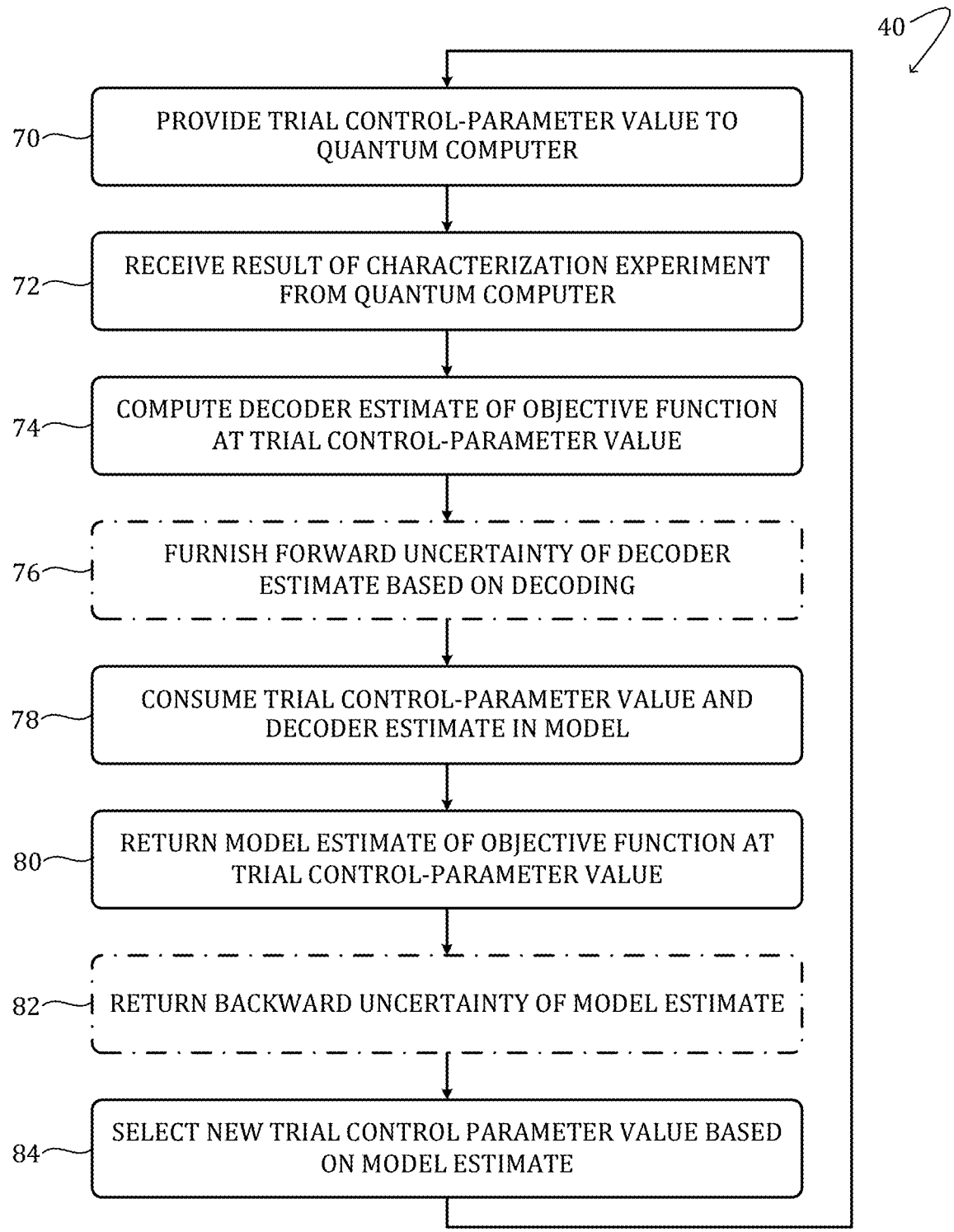
FIG. 7 shows additional aspects of the method of FIG. 4.
Figure 9:
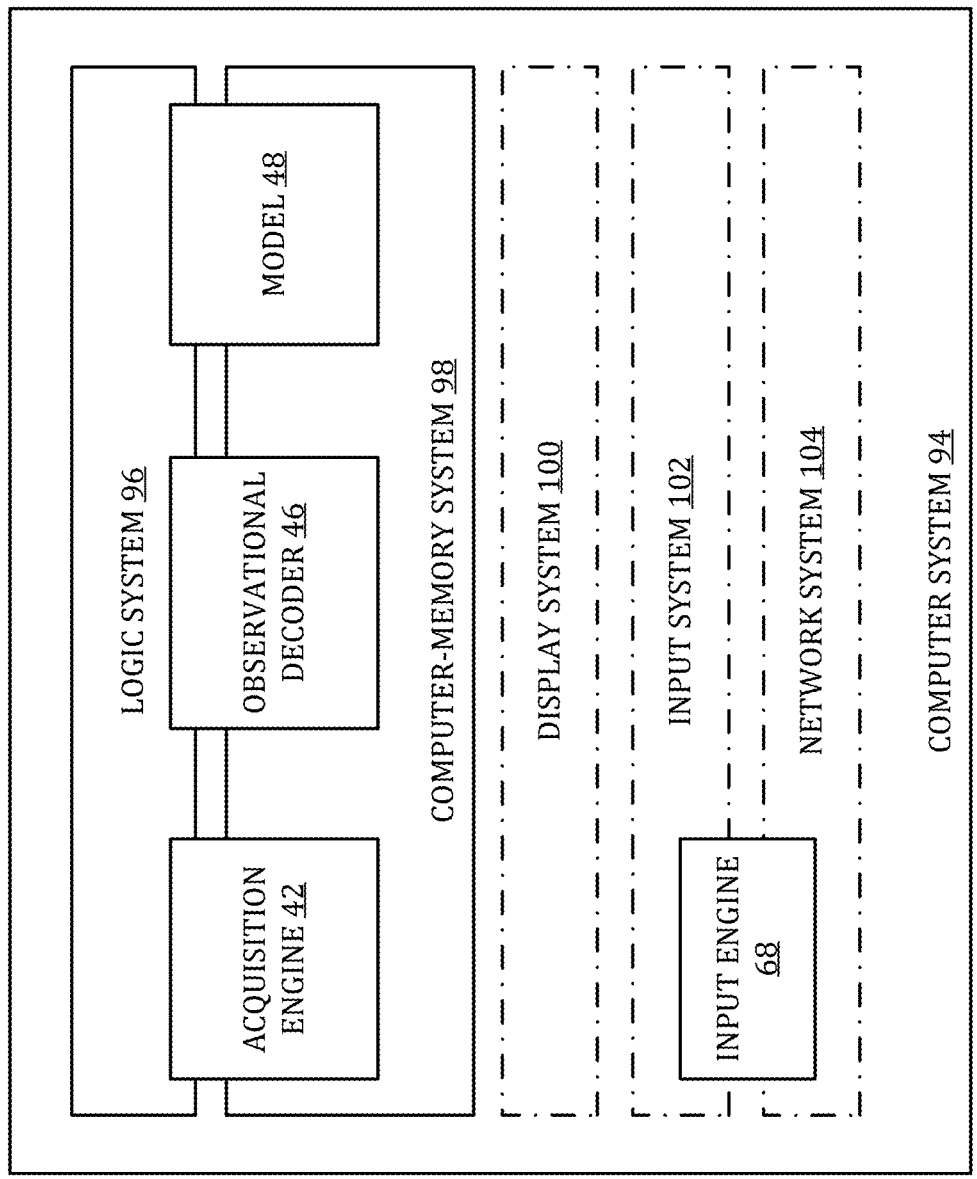
FIG. 9 shows aspects of an example classical computer system.

FIG. 7 shows additional aspects of example method 40 for calibrating a quantum-computing operation on a quantum computer. In particular, FIG. 7 illustrates the process flow from the perspective of a classical computer system coupled operatively to a quantum computer. In some examples, the classical computer system may be embodied as controller 18 of quantum computer 10 of FIG. 1. In other examples, the classical computer system may be separate from the quantum computer, as shown in FIG. 9. For ease of illustration method 40 is described with reference to the functional components introduced in FIG. 4: acquisition engine 42, characterization experiment 44, observational decoder 46, and a trained machine such as model 48. This description also refers to an input engine—e.g., input engine 68 of FIG. 1 or 9—configured to receive data from the quantum computer. In other examples, method 40 may be enabled by different functional components.

At 70 of method 40, the acquisition engine provides one or more trial control-parameter values to the quantum computer. Generally speaking, the one or more trial control-parameter values control a characterization experiment enacted on the quantum computer. In some examples, any, some, or all of the trial control-parameter values may be values of hardware-control parameters, as in Examples I, II, III, and V. In some examples, any, some or all of the trial control-parameter values may be values of software-control parameters, as in Example IV.

At 72 the input engine receives from the quantum computer one or more results of the characterization experiment enacted according to the one or more trial control-parameter values. In some examples, any, some, or all of the results may comprise a quantum-mechanical basis state of one or more qubits of the quantum computer. In some examples a result may comprise a set of eigenvalues, as described in the context of Example IV.

At 74 the observational decoder computes an estimate of the objective function evaluated at the one or more trial control-parameter values by decoding the one or more results of the characterization experiment. In some examples, such decoding comprises statistically inferring a function based on a plurality of experimental results—e.g., results received at 72 of method 40. In some examples, any, some, or all of the results may comprise a real-valued function; here, the decoding may comprise transforming the real-valued function, as in Example III.

At 76, optionally, the observational decoder furnishes a forward uncertainty of the decoder estimate based on decoding the one or more results of the characterization experiment. At 78 the trained machine consumes the one or more trial control-parameter values and the corresponding decoder estimate evaluated at the one or more trial control parameter values. At 80 the trained machine returns a model estimate of the objective function evaluated at the one or more trial control-parameter values. In examples in which the observational decoder furnishes the forward uncertainty of the decoder estimate, the model estimate returned by the machine may be further based on the forward uncertainty. At 82, optionally, the machine returns a backward uncertainty of the model estimate. In examples in which this step is enacted, the decoder estimate computed by the observational decoder (at 74) may be further based on the backward uncertainty.

At 84 the acquisition engine selects a new set of the one or more trial control-parameter values based on the model estimate, via global optimization. In method 40 the acquisition engine, the input engine, the observational decoder, and the machine may be configured for iterative execution, such that the one or more trial control-parameter values converge to values that optimize the objective function. In examples in which a plurality of control-parameter values control the characterization experiment, these values may be optimized in parallel in method 40.

Figure 8:
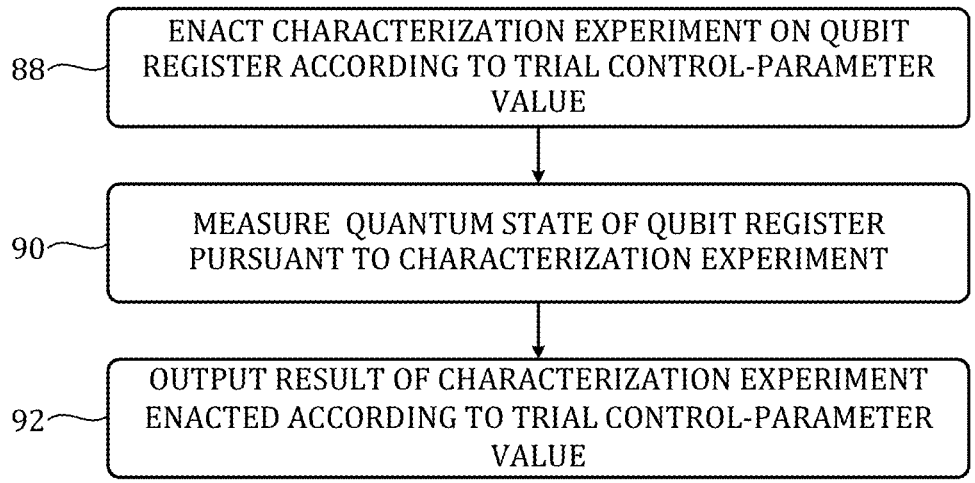
FIG. 8 shows aspects of an example method for operating a quantum computer during a calibration process.

FIG. 8 shows aspects of an example method 86 for operating a quantum computer during a calibration process in which method 40 is enacted. As noted in the context of FIG. 1, the quantum computer includes at least one qubit register and qubit interface, in addition to an output interface (in FIG. 1, the componentry of controller 18 furnishing outputs 32).

At 88 of method 86 the qubit interface enacts a characterization experiment on the qubit register according to one or more trial control-parameter values. As noted hereinabove, the one or more trial control-parameter values are selected based on a model estimate of an objective function evaluated at the one or more trial control-parameter values. At 90 the qubit interface measures the quantum state of the qubit register pursuant to the characterization experiment, to obtain a result of the characterization experiment enacted according to the one or more trial control-parameter values. At 92 the output interface outputs one or more results of the characterization experiment. Accordingly, the objective function may be estimated at a set of trial control-parameter values based on decoding the result of the characterization experiment. As noted hereinabove, the one or more trial control-parameter values and corresponding decoder estimate may be consumed by a machine trained to return the model estimate of the objective function evaluated at the one or more trial control-parameter values.

No aspect of the foregoing drawings or description is intended to be limiting in any sense, because numerous variations, extensions, and omissions are also envisaged. In addition to quantum applications, OBOE can be used for any classical optimization involving a complex process with control parameters that influence an experimental result, and where only the result is observable. By including an observational decoder, one is able to optimize the control parameter values for the best outcome. Non-exhaustive examples where such optimization is possible include (a) engine optimization where the input includes parameters of engine geometry and supplied fuel, and where the output is horsepower. Note that the horsepower fluctuates between different nominally identical engines and the fluctuations can be taken into account in the new model. Another example is (b) frame rate optimization of a video game. The exact scene and computer configurations are different for every gamer, but optimizing the settings of the game can be done using the disclosed approach. Another example is (c) meta-parameter tuning for neural networks. Here, the input and output of the machine-learning process contains noise, and the disclosed approach helps to improve the tuning.

3. Classical Computer System and Additional Description

The methods herein may be tied to a computer system of one or more computing devices. Such methods and processes may be implemented as an application program or service, an application programming interface (API), a library, and/or other computer-program product.

FIG. 9 provides a schematic representation of a classical computer 94 configured to provide some or all of the classical computer system functionality disclosed herein. Classical computer 94 may take the form of a personal computer, application-server computer, or any other computing device.

Classical computer 94 includes a logic system 96 and a computer-memory system 98. Classical computer 94 may optionally include a display system 100, an input system 102, a network system 104, and/or other systems not shown in the drawings.

Logic system 96 includes one or more physical devices configured to execute instructions. For example, the logic system may be configured to execute instructions that are part of at least one operating system (OS), application, service, and/or other program construct. The logic system may include at least one hardware processor (e.g., microprocessor, central processor, central processing unit (CPU) and/or graphics processing unit (GPU)) configured to execute software instructions. Additionally or alternatively, the logic system may include at least one hardware or firmware device configured to execute hardware or firmware instructions. A processor of the logic system may be single-core or multi-core, and the instructions executed thereon may be configured for sequential, parallel, and/or distributed processing. Individual components of the logic system optionally may be distributed among two or more separate devices, which may be remotely located and/or configured for coordinated processing. Aspects of the logic system may be virtualized and executed by remotely-accessible, networked computing devices configured in a cloud-computing configuration.

Computer-memory system 98 includes at least one physical device configured to temporarily and/or permanently hold computer system information, such as data and instructions executable by logic system 96. When the computer-memory system includes two or more devices, the devices may be collocated or remotely located. Computer-memory system 98 may include at least one volatile, nonvolatile, dynamic, static, read/write, read-only, random-access, sequential-access, location-addressable, file-addressable, and/or content-addressable computer-memory device. Computer-memory system 98 may include at least one removable and/or built-in computer-memory device. When the logic system executes instructions, the state of computer-memory system 98 may be transformed—e.g., to hold different data.

Aspects of logic system 96 and computer-memory system 98 may be integrated together into one or more hardware-logic components. Any such hardware-logic component may include at least one program- or application-specific integrated circuit (PASIC/ASIC), program- or application-specific standard product (PSSP/ASSP), system-on-a-chip (SOC), or complex programmable logic device (CPLD), for example.

Logic system 96 and computer-memory system 98 may cooperate to instantiate one or more logic machines or engines. As used herein, the terms 'machine' and 'engine' each refer collectively to a combination of cooperating hardware, firmware, software, instructions, and/or any other components that provide computer system functionality. In other words, machines and engines are never abstract ideas and always have a tangible form. A machine or engine may be instantiated by a single computing device, or a machine or engine may include two or more subcomponents instantiated by two or more different computing devices. In some implementations, a machine or engine includes a local component (e.g., a software application executed by a computer system processor) cooperating with a remote component (e.g., a cloud computing service provided by a network of one or more server computer systems). The software and/or other instructions that give a particular machine or engine its functionality may optionally be saved as one or more unexecuted modules on one or more computer-memory devices.

Machines and engines may be implemented using any suitable combination of machine learning (ML) and artificial intelligence (AI) techniques. Non-limiting examples of techniques that may be incorporated in an implementation of one or more machines include support vector machines, multi-layer neural networks, convolutional neural networks (e.g., spatial convolutional networks for processing images and/or video, and/or any other suitable convolutional neural network configured to convolve and pool features across one or more temporal and/or spatial dimensions), recurrent neural networks (e.g., long short-term memory networks), associative memories (e.g., lookup tables, hash tables, bloom filters, neural Turing machines and/or neural random-access memory) unsupervised spatial and/or clustering methods (e.g., nearest neighbor algorithms, topological data analysis, and/or k-means clustering), and/or graphical models (e.g., (hidden) Markov models, Markov random fields, (hidden) conditional random fields, and/or AI knowledge bases)).

When included, display system 100 may be used to present a visual representation of data held by computer-memory system 98. The visual representation may take the form of a graphical user interface (GUI) in some examples. The display system may include one or more display devices utilizing virtually any type of technology. In some implementations, display system may include one or more virtual-, augmented-, or mixed reality displays.

When included, input system 102 may comprise or interface with one or more input devices. An input device may include a sensor device or a user input device. Examples of user input devices include a keyboard, mouse, or touch screen.

When included, network system 104 may be configured to communicatively couple classical computer 94 with one or more other computer systems. The network system may include wired and/or wireless communication devices compatible with one or more different communication protocols. The network system may be configured for communication via personal-, local- and/or wide-area networks.

This disclosure is presented by way of example and with reference to the attached drawing figures. Components, process steps, and other elements that may be substantially the same in one or more of the figures are identified coordinately and described with minimal repetition. It will be noted, however, that elements identified coordinately may also differ to some degree. It will be further noted that the figures are schematic and generally not drawn to scale. Rather, the various drawing scales, aspect ratios, and numbers of components shown in the figures may be purposely distorted to make certain features or relationships easier to see. The plots shown in the drawings are theoretical unless otherwise noted.

In conclusion, one aspect of this disclosure is directed to a method for calibrating a quantum-computing operation on a quantum computer. The method comprises (a) providing a trial control-parameter value to the quantum computer; (b) receiving from the quantum computer a result of a characterization experiment enacted according to the trial control-parameter value; (c) computing a decoder estimate of an objective function evaluated at the trial control-parameter value based on decoding the result of the characterization experiment; (d) consuming the trial control-parameter value and the decoder estimate in a machine trained to return a model estimate of the objective function evaluated at the trial control-parameter value; and (e) selecting a new trial control-parameter value based on the model estimate.

In some limitations, the method further comprises furnishing a forward uncertainty of the decoder estimate based on decoding the result of the characterization experiment, and the machine is trained to return the model estimate further based on the forward uncertainty. In some implementations, the machine is further trained to return a backward uncertainty of the model estimate, and the decoder estimate is further based on the backward uncertainty estimate. In some implementations, said providing, receiving, computing, consuming, and selecting are enacted iteratively such that the trial control-parameter value converges to a control-parameter value that optimizes the objective function. In some implementations, the trial control-parameter value is one of a plurality of control-parameter values optimized in parallel. In some implementations, the result comprises a quantum-mechanical basis state. In some implementations, the result is one of a plurality of results, and returning the decoder estimate comprises statistically estimating a function based on the plurality of results. In some implementations, the result comprises a real-valued function, and returning the decoder estimate comprises transformation of the real-valued function. In some implementations, the result comprises a set of eigenvalues. In some implementations, the trial control-parameter value is a value of a hardware-control parameter. In some implementations, the trial control-parameter value is a value of a software-control parameter. In some implementations, the machine is trained via machine learning.

Another aspect of this disclosure is directed to a quantum computer comprising a qubit register, a qubit interface operatively coupled to the qubit register, and an output interface operatively coupled to the qubit interface. The qubit interface is configured to: (a) enact a characterization experiment on the qubit register according to a trial control-parameter value selected based on a model estimate of an objective function evaluated at the trial control parameter value, and (b) measure a quantum state of the qubit register pursuant to the characterization experiment to obtain a result of the characterization experiment enacted according to the trial control-parameter value. The output interface is configured to output the result of the characterization experiment, wherein the objective function is estimated at the trial control-parameter value based on decoding the result of the characterization experiment to give a decoder estimate, and wherein the trial control-parameter value and the decoder estimate are consumed in a machine trained to return the model estimate.

In some implementations, the result comprises a quantum-mechanical basis state. In some implementations, the trial control-parameter value is a value of a hardware-control parameter. In some implementations, a forward uncertainty of the decoder estimate is furnished based on decoding the result of the characterization experiment, the machine is trained to return the model estimate further based on the forward uncertainty and further trained to return a backward uncertainty of the model estimate, and the decoder estimate is further based on the backward uncertainty.

Another aspect of this disclosure is directed to a computer system comprising an acquisition engine, an input engine, an observational decoder, and a trained machine. The acquisition engine is configured to provide a trial control-parameter value to a quantum computer. The input engine is configured to receive from the quantum computer a result of a characterization experiment enacted according to the trial control-parameter value. The observational decoder is configured to compute a decoder estimate of an objective function evaluated at the trial control-parameter value based on decoding the result of the characterization experiment. The trained machine is configured to consume the trial control-parameter value and the decoder estimate, and to return a model estimate of the objective function evaluated at the trial control-parameter value. Here the acquisition engine is further configured to select a new trial control-parameter value based on the model estimate.

In some implementations, the observational decoder is further configured to furnish a forward uncertainty of the decoder estimate based on decoding the result of the characterization experiment, and the machine is further trained to return the model estimate further based on the forward uncertainty. In some implementations, the machine is further trained to return a backward uncertainty of the model estimate, and the observational decoder is further configured to return the decoder estimate further based on the backward uncertainty.

In some implementations, the acquisition engine, the input engine, the observational decoder, and the machine are configured for iterative execution, such that the trial control-parameter value converges to a control-parameter value that optimizes the objective function.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for calibrating a quantum-computing operation on a quantum computer, the method comprising:
   providing a trial control-parameter value to the quantum computer;
   receiving from the quantum computer a result of a characterization experiment enacted according to the trial control-parameter value;
   computing a decoder estimate of an objective function evaluated at the trial control-parameter value based on decoding the result of the characterization experiment;
   consuming the trial control-parameter value and the decoder estimate in a machine trained to return a model estimate of the objective function evaluated at the trial control-parameter value; and
   selecting a new trial control-parameter value based on the model estimate,
   wherein said providing, receiving, computing, consuming, and selecting are enacted iteratively such that the trial control-parameter value converges to a control-parameter value that optimizes the objective function, and
   wherein each estimation of the objective function contributes to an evolving model that serves as a surrogate for actual evaluation of the objective function.

2. The method of claim 1 further comprising furnishing a forward uncertainty of the decoder estimate based on decoding the result of the characterization experiment, wherein the machine is trained to return the model estimate further based on the forward uncertainty.

3. The method of claim 1 wherein the machine is further trained to return a backward uncertainty of the model estimate, wherein the decoder estimate is further based on the backward uncertainty estimate.

4. The method of claim 1 wherein the trial control-parameter value is one of a plurality of control-parameter values optimized in parallel.

5. The method of claim 1 wherein the result comprises a quantum-mechanical basis state.

6. The method of claim 1 wherein the result is one of a plurality of results, and wherein returning the decoder estimate comprises statistically estimating a function based on the plurality of results.

7. The method of claim 1 wherein the result comprises a real-valued function, and where returning the decoder estimate comprises transformation of the real-valued function.

8. The method of claim 1 wherein the result comprises a set of eigenvalues.

9. The method of claim 1 wherein the trial control-parameter value is a value of a hardware-control parameter.

10. The method of claim 1 wherein the trial control-parameter value is a value of a software-control parameter.

11. The method of claim 1 wherein the machine is trained via machine learning.

12. A quantum computer comprising:
a qubit register;
a qubit interface operatively coupled to the qubit register and configured to:
iteratively enact a characterization experiment on the qubit register according to a trial control-parameter value selected based on a model estimate of an objective function evaluated at the trial control parameter value, and
iteratively measure a quantum state of the qubit register pursuant to the characterization experiment to obtain a result of the characterization experiment enacted according to the trial control-parameter value; and
an output interface operatively coupled to the qubit interface and configured to output the result of the characterization experiment, wherein the objective function is iteratively estimated at each trial control-parameter value based on decoding the result of the characterization experiment using Bayes' rule, to give a decoder estimate,
wherein each estimation of the objective function contributes to an evolving model that serves as a surrogate for actual evaluation of the objective function, and wherein the trial control-parameter value and the decoder estimate are consumed in a machine trained to return the model estimate.

13. The quantum computer of claim 12 wherein the result comprises a quantum-mechanical basis state.

14. The quantum computer of claim 13 wherein the trial control-parameter value is a value of a hardware-control parameter.

15. The quantum computer of claim 12 wherein a forward uncertainty of the decoder estimate is furnished based on decoding the result of the characterization experiment, wherein the machine is trained to return the model estimate further based on the forward uncertainty and further trained to return a backward uncertainty of the model estimate, and wherein the decoder estimate is further based on the backward uncertainty.

16. A computer system comprising:
an acquisition engine configured to iteratively provide a trial control-parameter value to a quantum computer;
an input engine configured to iteratively receive from the quantum computer a result of a characterization experiment enacted according to the trial control-parameter value;
an observational decoder configured to iteratively compute a decoder estimate of an objective function evaluated at the trial control-parameter value based on decoding the result of the characterization experiment, wherein estimation of the objective function contributes to an evolving model that serves as a surrogate for actual evaluation of the objective function;
a trained machine configured to iteratively consume the trial control-parameter value and the decoder estimate, and to return a model estimate of the objective function evaluated at the trial control-parameter value,
wherein the acquisition engine is further configured to iteratively select a new trial control-parameter value based on the model estimate, such that the new trial control-parameter value converges to a control-parameter value that optimizes the objective function.

17. The computer system of claim 16 wherein the observational decoder is further configured to furnish a forward uncertainty of the decoder estimate based on decoding the result of the characterization experiment, and wherein the machine is further trained to return the model estimate further based on the forward uncertainty.

18. The computer system of claim 16 wherein the machine is further trained to return a backward uncertainty of the model estimate, and wherein the observational decoder is further configured to return the decoder estimate further based on the backward uncertainty.

19. The computer system of claim 16 wherein the acquisition engine, the input engine, the observational decoder, and the machine are configured for iterative execution, such that the trial control-parameter value converges to a control-parameter value that optimizes the objective function.

* * * * *